(12) United States Patent
Okamura

(10) Patent No.: US 6,897,989 B2
(45) Date of Patent: May 24, 2005

(54) BLACK REFERENCE DATA CALCULATION METHOD AND IMAGE READER

(75) Inventor: Yukio Okamura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 819 days.

(21) Appl. No.: 09/934,485

(22) Filed: Aug. 23, 2001

(65) Prior Publication Data
US 2002/0054399 A1 May 9, 2002

(30) Foreign Application Priority Data
Aug. 25, 2000 (JP) ........................... P.2000-255333

(51) Int. Cl.⁷ .................... H04N 1/46; G06K 15/00
(52) U.S. Cl. .................. 358/529; 358/521; 358/504; 358/509
(58) Field of Search ................ 358/3.26, 504, 358/509, 513, 514, 516, 520, 521, 529, 530, 471, 475, 483

(56) References Cited

U.S. PATENT DOCUMENTS

| | | | |
|---|---|---|---|
| 4,903,144 A | 2/1990 | Stefanik et al. | 358/443 |
| 4,912,558 A | 3/1990 | Easterly et al. | 358/447 |
| 5,070,414 A | 12/1991 | Tsutsumi | 358/466 |
| 5,644,409 A | 7/1997 | Irie et al. | 358/461 |
| 5,677,522 A * | 10/1997 | Rice et al. | 235/454 |
| 6,219,460 B1 * | 4/2001 | Tatsuta | 382/270 |
| 6,822,679 B1 * | 11/2004 | Kulhalli et al. | 348/246 |

FOREIGN PATENT DOCUMENTS

| | | |
|---|---|---|
| EP | 0 585 124 A1 | 3/1994 |
| EP | 0 957 628 A2 | 11/1999 |
| JP | 4-25285 A | 1/1992 |
| JP | 2001257880 * | 9/2001 ........ H04N/1/405 |

* cited by examiner

Primary Examiner—Jerome Grant, II
(74) Attorney, Agent, or Firm—Oliff & Berridge, PLC

(57) ABSTRACT

A light source is turned off (S101), incidence of light on a line sensor is shut off, and the output value of an electric signal output from each of pixels of the line sensor (S102). Since the output value is detected 128 times (S103), random noise can be reduced equal to or less than the variation in the output values for each pixel of the line sensor. The output values detected by a detection section are added up by an average value difference calculation section (S104). The sum total of the output values is divided by the number of detection times (S105) to calculate the average value of the output values (S106). The average value difference calculation section calculates the difference between a setup value and the average value as an average value difference (S107) and the average value difference is stored in black reference memory for each pixel (S108). The average value difference is stored in the black reference memory, so that the storage capacity can be decreased as compared with the case where black reference data itself is stored.

5 Claims, 4 Drawing Sheets

| P1 | P2 | P3 | P4 | P5 | P6 | P7 | P8 | P9 | P10 |
|----|----|----|----|----|----|----|----|----|-----|
| 12 | 13 | 9  | 16 | 6  | 19 | 5  | 20 | 13 | 10  |

~422

| M1 | M2 | M3 | M4 | M5 | M6 | M7 | M8 | M9 | M10 |
|----|----|----|----|----|----|----|----|----|-----|
| +2 | +3 | -1 | +6 | -4 | +9 | -5 | +10| +3 | 0   |

~52

BLACK REFERENCE DATA CALCULATION METHOD AND IMAGE READER

BACKGROUND OF THE INVENTION

This invention relates to a black reference data calculation method of an image pick-up system used with an image reader and an image reader.

Generally, an image reader for applying light from a light source to an original placed on an original mounting stage and reading light reflected on the original or passing through the original by a image pick-up system as image data is known.

The image pick-up system used with the image reader as mentioned above has a plurality of pixels implemented as charge-coupled device. An electric signal responsive to the amount of received light is output from each of the pixels constructing the image pick-up system.

Since a plurality of pixels constructing the image pick-up system, the output value varies from one pixel to another to some extent. The light amount of a mercury lamp, a xenon lamp, etc., for example, used as a light source of the image reader in either end portion differs from the light amount in the center portion; both end portions become dark as compared with the center portion.

Thus, variations in output values of pixels or variations in light amounts of a light source is corrected by making a shading correction to the electric signal output from each pixel.

To make a shading correction, before the original read operation is executed, white reference and black reference are read and a correction value is calculated based on the electric signal output from each pixel. As for the white reference, for example, a white reference member of high reflectivity disposed on the rear of an original guide for defining the position of an original is read, whereby white reference correction data for each pixel is created. On the other hand, for the black reference, the output value of the electric signal output from each pixel of image pick-up system is detected with the light source off, whereby variations in the output values of the pixels are detected and black reference data is created.

The created black reference data is stored in a storage section of RAM, etc., and is used to correct the electric signal output from each pixel when an original is read. Arts for creating and storing the black reference data for each pixel of image pick-up system are disclosed in JP-A-4-25285 and JP-A-5-268474.

However, according to the arts disclosed in JP-A-4-25285 and JP-A-5-268474, the black reference data is stored in the storage section for each pixel and thus the storage section requires a capacity responsive to the number of pixels. Consequently, a large storage capacity is required for storing the black reference data.

According to the art disclosed in JP-A-5-268474, a method of detecting the electric signal output from each pixel about several times and setting the black reference data for creating black reference data with the decreased effect of random noise is disclosed. However, if the electric signal is detected about several times and the detection values are averaged, accurate black reference data with the decreased effect of random noise cannot be provided, resulting in a problem of increasing noise contained in an image.

SUMMARY OF THE INVENTION

It is therefore an object of the invention to provide a black reference data calculation method of calculating black reference data requiring a small storage capacity.

It is another object of the invention to provide a black reference data calculation method for reducing the noise of random noise.

It is still another object of the invention to provide an image reader for reducing the noise of random noise and improving the quality of a read image.

In order to solve the aforesaid object, the invention is characterized by having the following arrangement.

(1) A black reference data calculation method for calculating black reference data of a plurality of pixels constituting an image pick-up system for each pixel, the method comprising:

a light shut-off step of shutting off light incident on the image pick-up system;

a detection step of detecting an output value of an electric signal output from each of the pixels a predetermined number of times for each pixel in a state that light incident on the image pick-up system is shut off;

an output value adding-up step of adding up the output values detected at the detection step for each pixel;

an average value calculation step of dividing the sum total of the output values added up at the output value adding-up step by the number of times the output value has been detected at the detection step to calculate an average value of the output values for each pixel; and a storage step of storing a difference between a previously setup value and the average value calculated at the average value calculation step for each pixel as the black reference data.

(2) The black reference data calculation method according to (1), wherein the output value detection step is to detect the output value 100 times or more.

(3). An image reader comprising:

a light source for applying light to an original;

an image pick-up system including a plurality of pixels each for receiving light from the original and outputting an electric signal responsive to the received light amount;

a detector for detecting an output value of the electric signal output from the image pick-up system a predetermined number of times in a state that the light source is shut off;

an average value difference calculator for finding an average value of the output values detected by the detector for each pixel and calculating a difference between the average value for each pixel and a previously setup value as an average value difference; and a storage section for storing the setup value and the average value difference for each pixel.

(4) The image reader according to (3), wherein the storage section has a first storage section for storing the setup value and a second storage section for storing the average value difference for each pixel.

(5) The image reader according to (3), wherein the detector detects the output value of the electric signal output from each of the pixels 100 times or more.

According to the black reference data calculation method according to (1) or the image reader according to (3), since the black reference data is calculated for each pixel and the difference between the average value and the setup value is recorded, the storage capacity can be lessened as compared with the case where the black reference data for each pixel is stored intact.

According to the black reference data calculation method according to (2) or the image reader according to (5), since the random noise is inversely proportional to the square root of the number of detection times by averaging, and the number of detection times is set to 100 or more and the output values are averaged, the random noise can be reduced equal to or less than the variation in the output values from each pixel. Therefore, the effect of the random noise can be decreased and the quality of the read image can be improved.

According to the image reader according to (4), since the storage section is separated into the first storage section and the second storage section, the capacity of the first storage section for storing the setup value can be lessened. Since the average value differences are stored in the second storage section, is recorded, the storage capacity can be decreased as compared with the case where the black reference data itself is stored.

DETAILED DESCRIPTION OF PREFERRED EMBODIMENT

Referring now to the accompanying drawings, there is shown a preferred embodiment of the invention.

Figure 2:
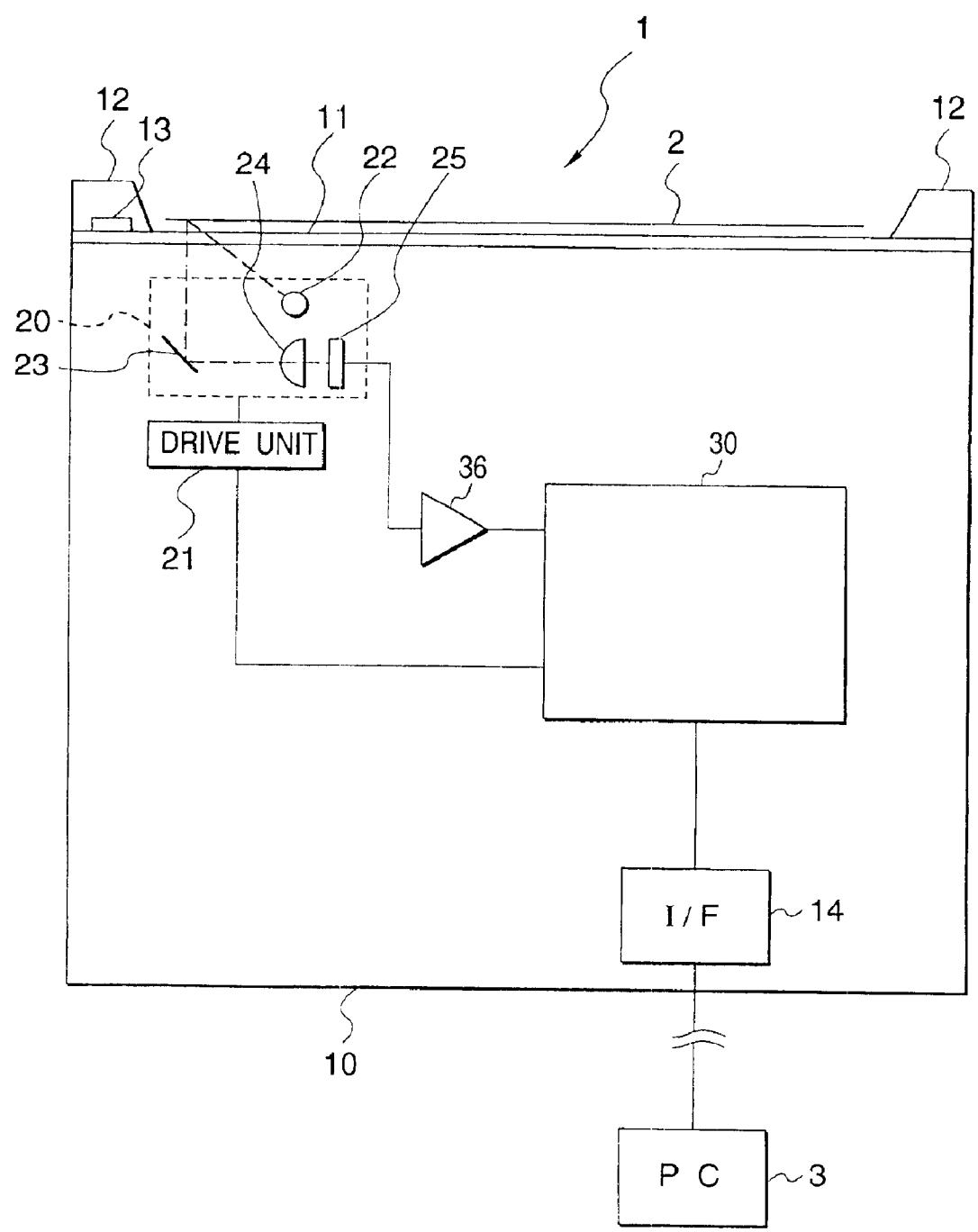
FIG. 2 is a schematic drawing to show the image reader according to the embodiment of the invention.
Figure 3:
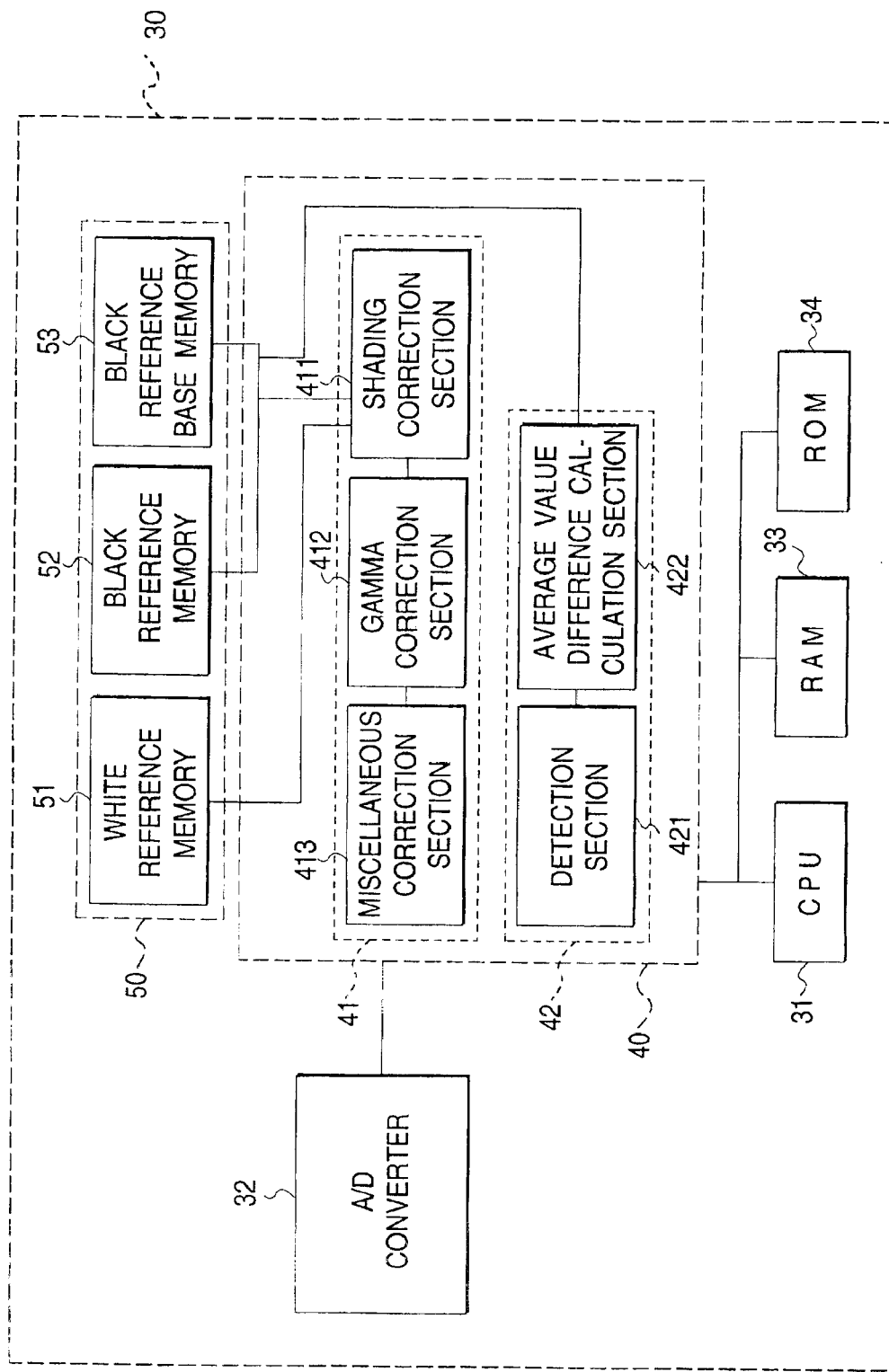
FIG. 3 is a block diagram to show a processing section of the image reader according to the embodiment of the invention.

FIG. 2 shows an image reader according to one embodiment of the invention.

As shown in FIG. 2, the image reader 1 includes a main unit 10 shaped like a box and an original mounting stage 11 on which an original 2 is placed is disposed on the top of the main unit 10. A carriage 20 that can be reciprocated in a subscanning direction parallel with the original mounting stage 11 by drive unit 21 is provided in the main unit 10.

A light source 22, a mirror 23, a condensing lens 24, and a line sensor as image pick-up system are mounted on the carriage 20. The mirror 23 is provided for reflecting light from the original 2 gathered on the line sensor 25 and lengthening the optical path. The condensing lens 24 allows light from the original 2 to be incident on the line sensor 25. The line sensor 25 uses an optical sensor of charge storage type comprising a plurality of pixels of CCD, etc., arranged linearly in a perpendicular direction to the move direction of the carriage 20.

The light source 22 is placed in a main scanning direction perpendicular to the move direction of the carriage 20; a fluorescent lamp, etc., is used as the light source. Light applied from the light source 22 is reflected on the surface of the original 2, such as paper, and is made incident on the line sensor 25.

The original mounting stage 11 is surrounded by an original guide 12 for positioning the placement position of the original 2 to be read and regulating a move of the original 2 when the original is read. White reference 13 having a uniform reflection surface of high reflectivity is placed at an end part of the original mounting stage 11 in the carriage move direction.

The main unit 10 contains a processing section 30 constituted by a CPU (central processing unit) 31, an A/D converter 32, RAM (random access memory) 33, ROM (read-only memory) 34, an image processing section 40, and a storage section 50. The CPU 31 performs whole control of the image reader 1 such as drive control of the carriage 20, control of turning on and off the light source 22, and processing of image data created in the image processing section 40. The A/D converter 32 converts analog electric signal output from the line sensor 25 and amplified by an amplifier 36 into a digital electric signal. The RAM 33 temporarily stores the digital electric signal output from the A/D converter 32, the image data created in the image processing section 40, and the like. A computer program executed by the CPU 31 for controlling the components of the image reader 1 is stored in the ROM 34.

The image processing section 40 has a correction section 41 and a black reference data creation section 42. The correction section 41 is constituted by a shading correction section 411, a gamma correction section 412, and a miscellaneous correction section 413.

For the digital signal output from the A/D converter 32, the shading correction section 411 of the correction section 41 corrects variations in sensitivity for each element of the line sensor 25 or variations in light amounts of the light source 22 in the main scanning direction by utilizing white reference data provided by reading the white reference 13 before read is started and black reference data created by the black reference data creation section 42. The gamma correction section 412 makes a gamma correction based on a predetermined gamma function and converts the digital light amount signal undergoing the shading correction into digital image data. The miscellaneous correction section 413 executes miscellaneous conversion of color correction, edge enhancement, area scaling up and down, etc.

The digital image data created in the image processing section 40 is output through an interface 14 provided in the main unit 10 to an external image processing apparatus, such as a personal computer 3, connected to the image reader.

The black reference data creation section 42 includes a detection section 421 and an average value difference calculation section 422. The detection section 421 detects a digital output value for each pixel of the line sensor 25. The average value difference calculation section 422 averages the digital output values detected by the detection section 421 for each pixel of the line sensor 25, and calculates the difference between the average output value for each pixel and a previously setup value as an average value difference.

The storage section 50 is implemented as RAM and is constituted by white reference memory 51, black reference memory 52 as a second storage section, and black reference base memory 53 as a first storage section. The white reference memory 51, the black reference memory 52, and the black reference base memory 53 are provided as the same or different RAM devices.

Figure 1:
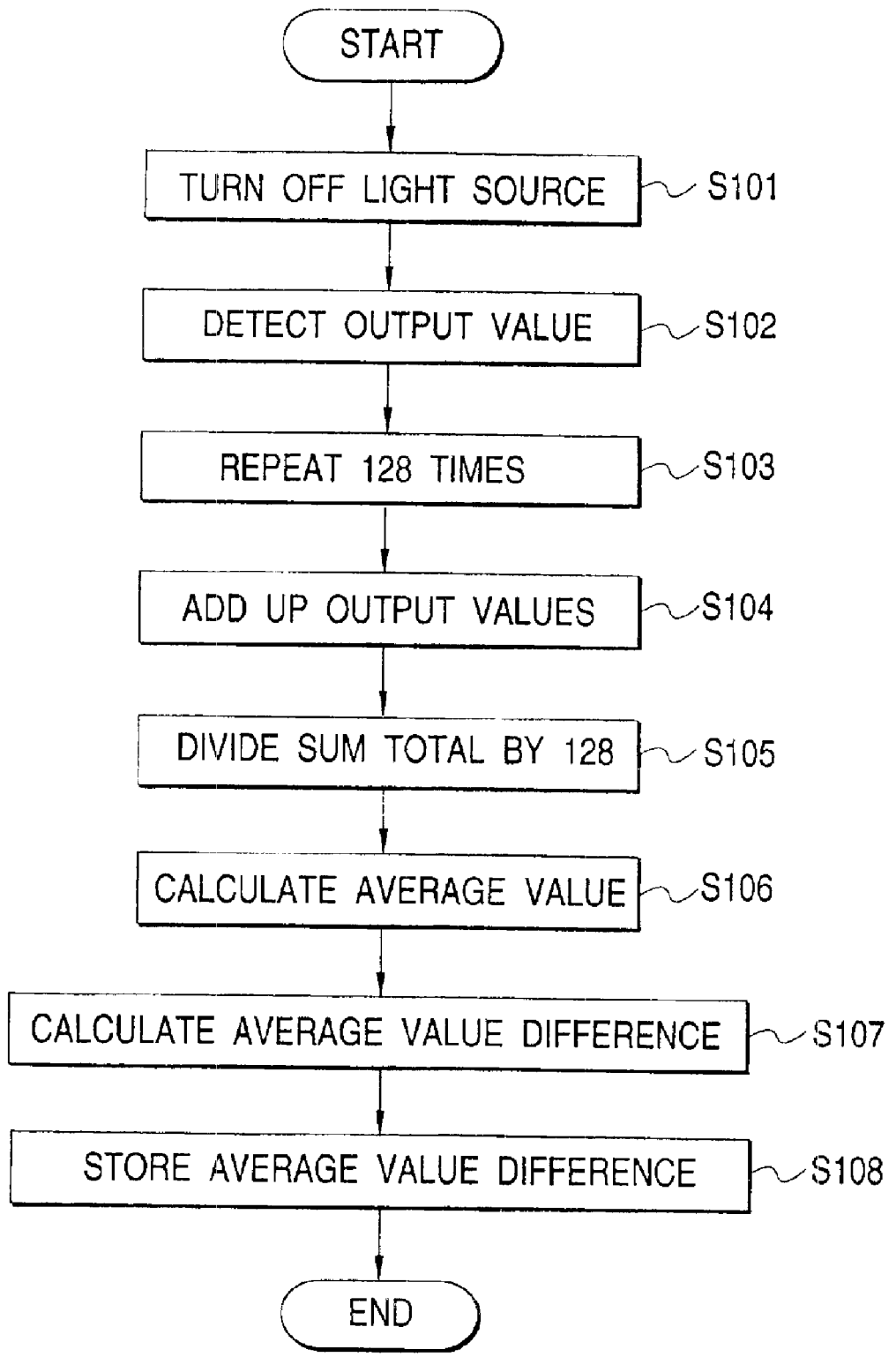
FIG. 1 is a flowchart to show a flow of a black reference calculation method of an image reader according to one embodiment of the invention.

Next, a black reference calculation method of the image reader 1 according to the embodiment will be discussed with reference to FIG. 1.

To calculate the black reference data, the light source 22 is turned off (S101). As the light source 22 is turned off, incidence of light on the line sensor 25 is shut off. In the state that incidence of light on the line sensor 25 is shut off, the CPU 31 instructs the detection section 421 to detect the digital output value from each pixel of the line sensor 25 for each pixel. The detection section 421 detects the digital output value from each pixel of the line sensor 25 in response to the instruction from the CPU 31 (S102).

The detection section 421 detects the output value a predetermined number of times. In the embodiment, the output value is detected 128 times (S103). The reason why the number of times the output value of the electric signal output from each pixel of the line sensor 25 is detected is set to 128 in the embodiment is as follows:

In the state that light incident on the line sensor 25 is shut off, there is about 1 mV variation in the output value of the electric signal output from each pixel of the line sensor 25. On the other hand, random noise occurring in each pixel of the line sensor 25 is about 10 mV. Thus, unless the random noise occurring from each pixel of the line sensor 25 is reduced to at least $\frac{1}{10}$, the output value from each pixel of the line sensor 25 with incident light shut off, namely, dark-time output cannot accurately be found.

In execute of the averaging processing, if the number of times an output value is to be detected is set to n times, random noise can be decreased by $1/(n^{1/2})$. Therefore, to reduce the random noise to $\frac{1}{10}$, the number of detection times, n, needs to be set to 100 or more. Considering internal processing of data in the processing section 30, it is desirable that the number of detection times should be set to $2^m$ (m is an integer). Therefore, in the embodiment, the number of detection times is set to $2^7=128$.

The digital output values from each pixel of the line sensor 25, detected by the detection section 421 are sent to the average value difference calculation section 422, and then the average value difference calculation section 422 adds up the digital output values for each pixel of the line sensor 25 (S104). That is, whenever the output value for each pixel of the line sensor 25 is detected in the detection section 421, the output values are added up. Therefore, the output value for each pixel of the line sensor 25 is detected 128 times and the 128 output values are added up.

The sum total of the output values for each pixel is divided by the number of times, n=128 (S105). That is, the average value of the output values for each pixel of the line sensor 25 is calculated (S106).

When the average value is calculated for each pixel of the line sensor 25, the average value difference calculation section 422 calculates the difference between a previously setup value and the average value as the average value difference (S107). The setup value is a preset offset value of black reference data and is stored in the black reference base memory 53 of the storage section 50.

The setup value can be preset by inputting from the outside of the image reader 1. The average values of the output values calculated for each pixel of the line sensor 25 may further be averaged and the result may be set as the offset value.

The average value difference calculation section 422 calculates the difference between the average value for each pixel and the setup value. The calculated difference between the average value and the setup value is stored in the black reference memory 52 for each pixel as the average value difference (S108).

Figure 4:
FIG. 4 is a drawing to schematically show a method of storing calculated black reference data in black reference memory in the black reference calculation method of the image reader according to the embodiment of the invention.

For example, assuming that the average values of the output values from pixels P1 to P10 of the line sensor 25, calculated by the average value difference calculation section 422 are P1=12, P2=13, P3=9, P4=16, P5=6, P6=19, P7-5, P8-20, P9-13, and P10=10 as shown in FIG. 4 and that if the setup value stored in the black reference base memory 53 is 10, M1=+2, M2=+3, M3=−1, M4=+6, M5=−4, M6=+9, M7=−5, M8=+10, M9=+3, and M10=0 are stored in storage locations M1 to M10 of the black reference memory 52 corresponding to the pixels P1 to P10 of the line sensors 25. Accordingly, the storage capacity is decreased as compared with the case where the output values of the pixels are stored in the black reference memory 52 as they are.

The reason why the black reference data is stored as the difference between each average value and the setup value is as follows:

To set white reference, the light amount at each end part of the light source 22 in the main scanning direction differs largely from the light amount at the center of the light source 22 and thus the output value from one pixel of the line sensor 25 also differs largely from that from another pixel. For example, assuming that the output gradation of the line sensor 25 is eight-bit, 256 gradation steps, the output value from one pixel at the end part of the line sensor 25 becomes about 100 because the end part of the light source 22 in the main scanning direction is dark. On the other hand, the output value from one pixel at the center of the line sensor 25 becomes 200 or more because the center of the light source 22 in the main scanning direction is well lighted.

Thus, to set the white reference, if the offset value is set for each pixel, the difference between the output values from the pixels is large and a decrease in the storage capacity of the white reference memory 51 is not accomplished.

In contrast, to set the black reference, the output values of the electric signals output from the pixels of the line sensor 25 almost equal and the difference there between is small. Thus, the offset value is set, whereby the storage capacity of the black reference memory 52 can be decreased efficiently.

The operation of the described image reader 1 is as follows:

When the image reader 1 is powered on, power is supplied to the components of the image reader 1 including the light source 22 and the line sensor 25. The CPU 31 instructs the image processing section 40 to read the white reference data and the black reference data. When the image processing section 40 is instructed to read the white reference data and the black reference data, first, reading the black referenced data is started. At this time, the light source 22 is turned off as instructed by the CPU 31. The image processing section 40 calculates the black reference data and stores the data in the black reference memory 52 according to the black reference calculation method described above.

Upon completion of calculating the black reference data, the CPU 31 turns on the light source 22 and starts calculating the white reference data. The white reference 13 is read to calculate the white reference data. The calculated white reference data is stored in the white reference memory 51.

Upon completion of calculating the black reference data and the white reference data, the CPU 31 notifies a driver program, such as TWAIN, started in the personal computer 3 that the image reader 1 is ready for reading an original. When the user recognizes that the image reader 1 is ready for reading an original, he or she places the original 2 to be read on the original mounting stage 11 and instructs the image reader 1 to start reading the original 2 through the personal computer 3.

When the user instructs the image reader 1 to start reading the original 2, the CPU 31 controls the drive system 21 to move the carriage 20 in the subscanning direction at constant speed. Light reflected on the original 2 is incident on the line sensor 25 and the incident light is converted into charges and the charges are accumulated. The accumulated charges are transferred to a shift register (not shown) of the line sensor 25 by a drive signal generated every predetermined time and an electric signal for one line is output from the line sensor 25. The digital image data corrected by the image processing section 40 is output via the interface 14 to the personal computer 3.

The above-mentioned processing is repeated while the carriage 20 is moved in the subscanning direction at constant speed, whereby the original 2 is read.

As described above, according to the image reader 1 in the embodiment of the invention, the average value is calculated for each pixel of the line sensor 25. The difference between the calculated average value and the setup value (offset value) is calculated and the calculated difference is stored in the black reference memory 52 as the black reference data. Thus, the storage capacity required for storing the black reference data can be decreased and the storage capacity of the black reference memory 52 can be lessened.

According to the image reader 1 according to the embodiment of the invention, the output value of the electric signal output from each pixel of the line sensor 25 is detected 100 times or more. Thus, the effect of random noise can be reduced less than the variation in output from the pixels. Therefore, the noise contained in the image data is decreased and the quality of the read image can be improved.

In the embodiment of the invention, the case where a reflection original such as paper is read using the image reader of flat bed type has been described. However, the invention can be applied not only to the image reader of flat bed type, but also to an image reader of sheet feed type, and can be applied to image readers for reading not only reflection originals, but also transparent originals such as films.

What is claimed is:

1. A black reference data calculation method for calculating black reference data of a plurality of pixels constituting an image pick-up system for each pixel, the method comprising:

a light shut-off step of shutting off light incident on the image pick-up system;

a detection step of detecting an output value of an electric signal output from each of the pixels a predetermined number of times for each pixel in a state that light incident on the image pick-up system is shut off;

an output value adding-up step of adding up the output values detected at the detection step for each pixel;

an average value calculation step of dividing the sum total of the output values added up at the output value adding-up step by the number of times the output value has been detected at the detection step to calculate an average value of the output values for each pixel; and a storage step of storing a difference between a previously setup value and the average value calculated at the average value calculation step for each pixel as the black reference data.

2. The black reference data calculation method according to claim 1, wherein the output value detection step is to detect the output value 100 times or more.

3. An image reader comprising:

a light source for applying light to an original;

an image pick-up system including a plurality of pixels each for receiving light from the original and outputting an electric signal responsive to the received light amount;

a detector for detecting an output value of the electric signal output from the image pick-up system a predetermined number of times in a state that the light source is shut off;

an average value difference calculator for finding an average value of the output values detected by the detector for each pixel and calculating a difference between the average value for each pixel and a previously setup value as an average value difference; and a storage section for storing the setup value and the average value difference for each pixel.

4. The image reader according to claim 3, wherein the storage section has a first storage section for storing the setup value and a second storage section for storing the average value difference for each pixel.

5. The image reader according to claim 3, wherein the detector detects the output value of the electric signal output from each of the pixels 100 times or more.

* * * * *